Oct. 14, 1958  H. W. SONTHEIM  2,856,041
WEATHER-SEALED WINDOW STRUCTURE
Filed Sept. 19, 1955
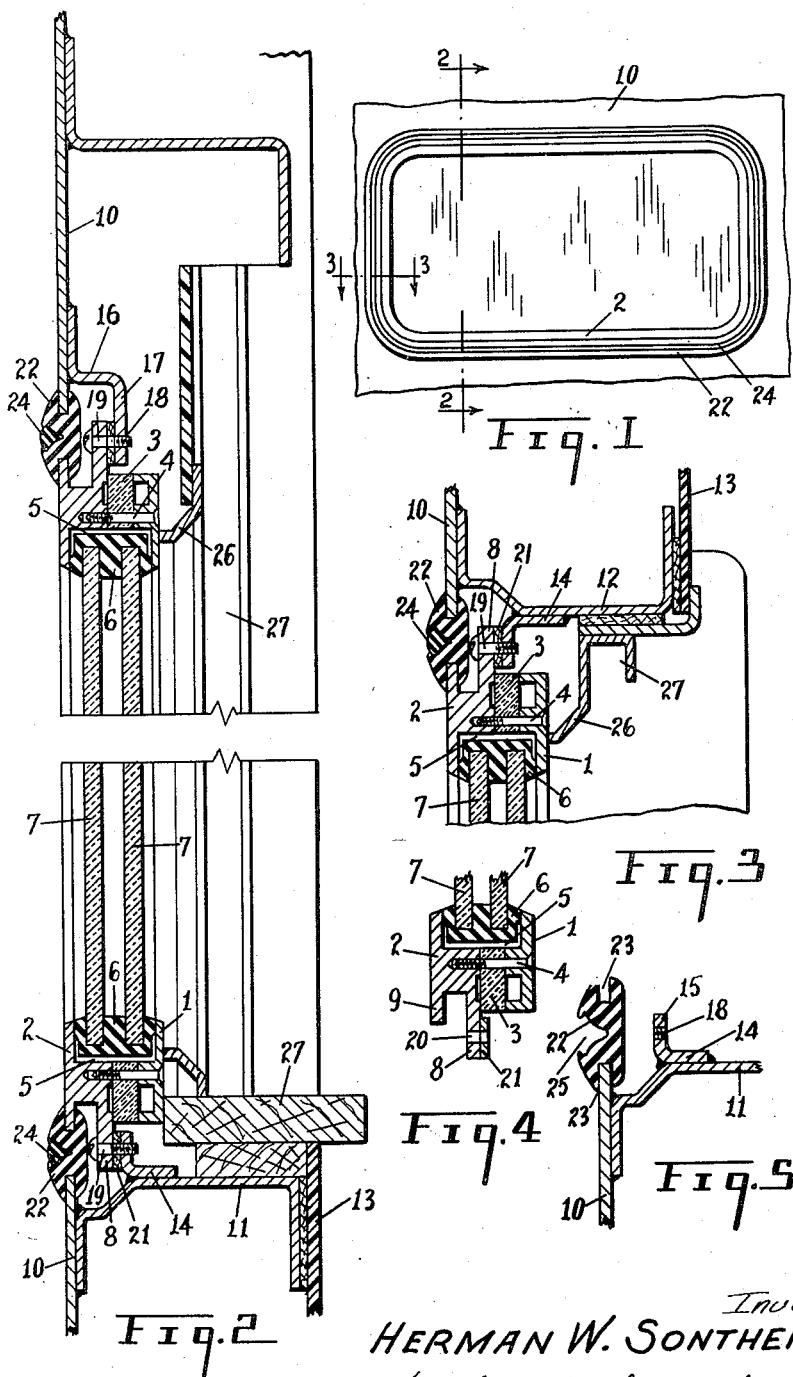
Inventor
HERMAN W. SONTHEIM
By Fetherstonhaugh & Co.
Attorneys

United States Patent Office 2,856,041
Patented Oct. 14, 1958

2,856,041

WEATHER-SEALED WINDOW STRUCTURE

Herman W. Sontheim, Verdun, Quebec, Canada, assignor to The Robert Mitchell Co., Limited, St. Laurent, Montreal, Quebec, Canada Application September 19, 1955, Serial No. 535,203

6 Claims. (Cl. 189—65)

This invention relates to weather sealed windows and particularly to the mounting of windows in railway cars and the like where the window is set into the wall framework from the outside and the weather seal protects and seals the window mounting from the weather and from unauthorized interference.

The invention consists essentially in the provision of a window sash which can be readily mounted in the wall of a car and be weather sealed without disturbing the inside trim on the car wall, particularly around the windows, where repeated fitting and stripping causes deterioration of the various parts concerned.

In the past it has been generally the practice to fit all windows on the inside of the car wall against a weather seal strip and, after the windows have been fitted, fitting the trim including such parts as curtain and shade guides. Should the window have to be removed for any reason, all such trim had first to be removed and before it could be again refitted, was very apt to get damaged and would have to be replaced.

The object of the invention is therefore to provide a method of mounting car windows which will obviate the necessity of disturbing the inside wall trim of the car when windows have to be removed.

A further object of the invention is to provide a car window sash whose component parts do not have to be taken apart in order to fit or remove the window sash.

A further object of the invention is to provide a car window sash which can be fitted in place after all interior decorating and trimming has been finished.

A further object of the invention is to provide a car window sash which can be fitted from the outside and is provided with a weather seal which does not require the fitting of elaborate seal flanges around the window.

These and other objects will be apparent from the following specification and the drawings illustrating the invention in which Fig. 1 is an outside elevation of a car window of the type disclosed in the present application.

Fig. 2 is a vertical sectional elevation taken on the line 2—2 of Fig. 1 and showing the window sash mounted in the car wall and sealed therein against the weather.

Fig. 3 is a horizontal section on the line 3—3 of Fig. 1 showing the window sash sealed in place against the side members of car wall structure.

Fig. 4 is a detail section of one edge of the window sash completely assembled ready for fitting.

Fig. 5 is a detail section of the car wall structure showing the mounting stop bracket with the seal strip fitted ready to receive the window sash shown in Fig. 4

Referring to the drawings, the window sash is comprised of an inner frame 1 and an outer frame 2 spaced apart by the insulation ring 3 and are held together as a unit by the screws 4. The two frames 1 and 2, when spaced apart by the insulation ring 3 form an inwardly facing channel 5 into which is bedded the window light supporting rubber cushion ring 6. In the drawings, two window lights 7 are shown. However, it is understood that either a single light or more than two lights could be used if desired. The screws 4 holding the two frames 1 and 2 together also compress the insulation ring 3 and the rubber cushion ring 6 so that the window lights 7 are held firmly in place within the sash frame. The compression of the rubber cushion ring 6 ensures that there will be no leakage of air or moisture from one side of the sash to the other while the insulation ring 3 prevents transference of temperature variations from the sash frame 1 to the sash frame 2 and vice-versa, except for that small portion that can be transferred by the screws 4. The rubber cushion ring 6 is so formed in section that it has room to "flow" within the channel 5 under any degree of pressure exerted by the screws 4 and will retain a certain degree of resiliency to take up shock transmitted to the sash from the car body.

The outer sash frame 2 has two outwardly extending flanges, both parallel with the plane of the sash. The inner flange 8 forms the sash mounting flange while the outer flange 9 is the sealing flange.

The car wall 10 is cut out to form a window opening whose edge is complementary in shape and slightly larger than the outside edge of the sash mounting flange 8. Extending inwardly from the car wall 10 are the bottom sill frame member 11 and the side frame members 12. These frame members 11 and 12 are channel shaped and provide a support for the car inner wall 13. Mounted on the inner facing sides of the frame members 11 and 12, are the sash support angle brackets 14 whose inwardly projecting legs 15 are disposed in a plane parallel with that of the car wall 10 at a distance which, when the sash frame is mounted thereon will bring the outer surface of the sash frame into the same plane as the outer surface of the car wall. A bracket 16 is mounted horizontally on the inner surface of the car wall 10 above the window opening and has a leg 17 disposed in the same plane of the leg 15 of the brackets 14. These brackets 14 and 16 are provided with a series of threaded holes 18 to receive the screws 19 which pass through the holes 20 in the flange 8 of the sash frame 2 and in the packing ring 21 which is interposed between the sash and its supporting brackets 14 and 16.

The self-sealing weather strip 22 has two oppositely disposed slots 23 which engage with the opposing edges of the window opening in the car wall 10 and with the frame 9 of the outer sash frame 2 to bridge and seal the gap therebetween. This weather strip 22 is of the type which when seated on the edge of the wall opening can be flexed to a considerable extent to receive the sash frame and is then held rigid by means of the filler strip 24 fitted into the strip channel 25.

The inner surface of the inner frame 1 of the sash fits snug against the window trim 26 and the edge of the sill 27. The side trim members can be formed to provide guides for the window shades as at 27 or for any other purpose and it will be noticed from Figs. 2 and 3 that the inner trim 26 and the inner wall structure 13 can be completely installed and finished before fitting the window sash in place and that the trim need not be dismantled if it is required to remove the window for any purpose whatsoever. In order to remove the window from the outside of the car, the filler strip 24 is first removed and then the sealing strip 22 can be flexed sufficient to remove it from engagement with the car wall 10 and sash frame 2, after which the screws 19 are removed and the sash withdrawn out through the opening in the car wall.

What I claim is:

1. In a car window sash mounting in combination, a car wall having a window opening therein, a sash mounting frame secured on the inside of said car wall disposed about said window opening and projecting inward- 1. ly in a plane parallel with and spaced inwardly from said car wall to define a rigid mounting surface exposed by said window opening, a sash frame having a pair of flanges extending outwardly therefrom, one of said flanges being in the same plane and flush with the outer surface of said car wall and the other flange being in a plane parallel with and spaced inwardly from the first mentioned flange, means to secure said latter flange to said sash mounting frame, and a sealing strip engaging with said car wall around the window opening and with the outer flange of the sash frame to bridge and weather-seal the gap therebetween.

2. In a car window sash mounting in combination, a car wall having a window opening therein, a sash mounting frame secured on the inside of said car wall disposed about said window opening and projecting inwardly in a plane parallel with and spaced inwardly from said car wall to define a rigid mounting surface exposed by said window opening, a sash frame adapted to be mounted on said mounting surface by insertion through the window opening in said car wall, said sash frame having a pair of flanges extending outwardly therefrom, one of said flanges being in the same plane and flush with the outer surface of said car wall and the other inner flange being in a plane parallel with and spaced inwardly from the first mentioned flange, means to secure said inner flange to said sash mounting frame, and a sealing strip engaging with said car wall around the window opening and with the outer flange of the sash frame to bridge and weather-seal the gap therebetween.

3. In a car window sash mounting in combination, a car wall having a window opening therein, a sash mounting frame secured on the inside of said car wall disposed about said window opening and projecting inwardly in a plane parallel with and spaced inwardly from said car wall to define a rigid mounting surface exposed by said window opening, a sash frame adapted to be mounted on said mounting surface by insertion through the window opening in said car wall, said sash frame having a pair of flanges extending outwardly therefrom, one of said flanges being in the same plane and flush with the outer surface of said car wall and the other inner flange being in a plane parallel with and spaced inwardly from the first mentioned flange, means to secure said inner flange to said sash mounting frame, and a sealing strip having a pair of oppositely disposed slots adapted to engage with said car wall around the window opening and with the outer flange of the sash frame to bridge and weather-seal the gap therebetween.

4. In a car window sash mounting in combination, a car wall having a window opening therein, a sash mounting frame on the inside of said car wall, said sash mounting frame comprising a sill and side channel members disposed about said window opening, an angle member mounted on said sill and side channel members having one leg thereof spaced inwardly from said car wall and disposed in a plane parallel therewith, a horizontal top member mounted on the inner side of the car wall above said window opening and having one leg thereof disposed in the same plane as one of the legs of the said first mentioned angle members and together therewith forming a sash frame mounting surface exposed by said window opening, a sash frame adapted to be mounted on said mounting surface by insertion through the window opening in said car wall, said sash frame having a pair of flanges extending outwardly therefrom, one of said flanges being in the same plane and flush with the outer surface of said car wall and the other inner flange being in a plane parallel with and spaced inwardly from the first mentioned flange, means to secure said inner flange to said sash frame mounting surface and a sealing strip having a pair of oppositely disposed slots adapted to engage with said car wall around the window opening and with the outer flange of the sash frame to bridge and weather-seal the gap therebetween.

5. In a car window sash mounting in combination, a car wall having a window opening therein, a sash mounting frame secured on the inside of said car wall disposed about said window opening and projecting inwardly in a plane parallel with and spaced inwardly from said car wall to define a rigid mounting surface exposed by said window opening, a sash frame adapted to be mounted on said mounting surface by insertion through the window opening in said car wall, said sash frame having a pair of flanges extending outwardly therefrom, one of said flanges being in the same plane and flush with the outer surface of said car wall and the other inner flange being in a plane parallel with and spaced inwardly from the first mentioned flange, means to secure said inner flange to said sash mounting frame, a flexible sealing strip engaging with said car wall around the window opening and with the outer flange of the sash frame to bridge and weather-seal the gap therebetween, and means to stiffen and lock said sealing strip in its weather-sealing position.

6. In a car window sash mounting in combination, a car wall having a window opening therein, a sash mounting frame on the inside of said car wall, said sash mounting frame comprising a sill and side channel members disposed about said window opening, an angle member mounted on said sill and side channel members having one leg thereof spaced inwardly from said car wall and disposed in a plane parallel therewith, a horizontal top member mounted on the inner side of the car wall above said window opening and having one leg thereof disposed in the same plane as one of the legs of said first mentioned angle member and together therewith forming, a sash frame mounting surface exposed by said window opening, a sash frame adapted to be mounted on said mounting surface by insertion through the window opening in said car wall and inwards beyond said sash frame mounting surface, the said sash frame having a pair of flanges extending outwardly therefrom, one of said flanges being in the same plane and flush with the outer surface of said car wall and the other inner flange being in a plane parallel with and spaced inwardly from the first mentioned flange, means to secure said inner flange to the outward facing surface of said sash frame mounting surface, and a sealing strip having a pair of oppositely disposed slots adapted to engage with said car wall around the window opening and with the outer flange of the sash frame to bridge and weather-seal the gap therebetween.

References Cited in the file of this patent

UNITED STATES PATENTS

| | | |
|---|---|---|
| 2,407,086 | Ledwinka et al. | Sept. 3, 1946 |
| 2,536,351 | Bureau | Jan. 2, 1951 |
| 2,587,547 | Steingruber | Feb. 26, 1952 |
| 2,690,822 | Meldrum | Oct. 5, 1954 |
| 2,770,487 | Isbell | Nov. 13, 1956 |

FOREIGN PATENTS

| | | |
|---|---|---|
| 664,002 | Great Britain | Jan. 2, 1952 |